H. WINDAHL.
POULTRY ROOST.
APPLICATION FILED SEPT. 25, 1918.
1,351,456.
Patented Aug. 31, 1920.
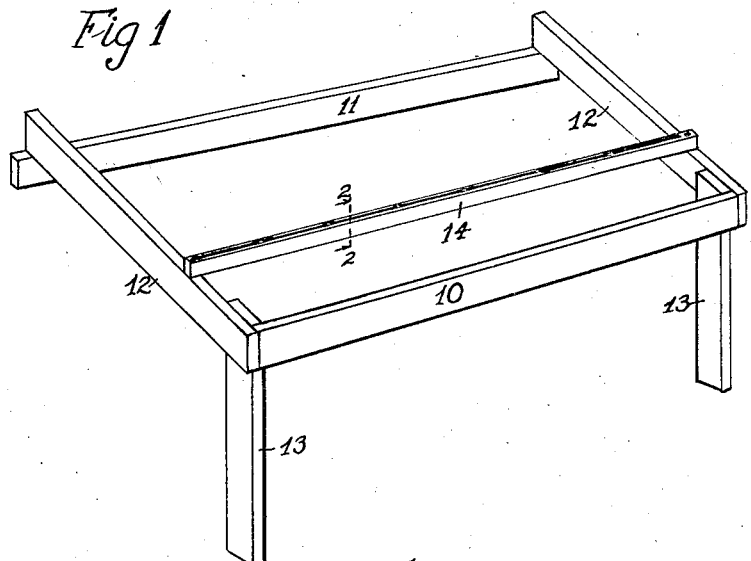
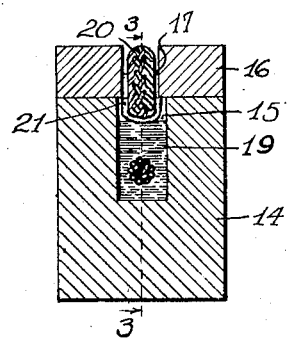
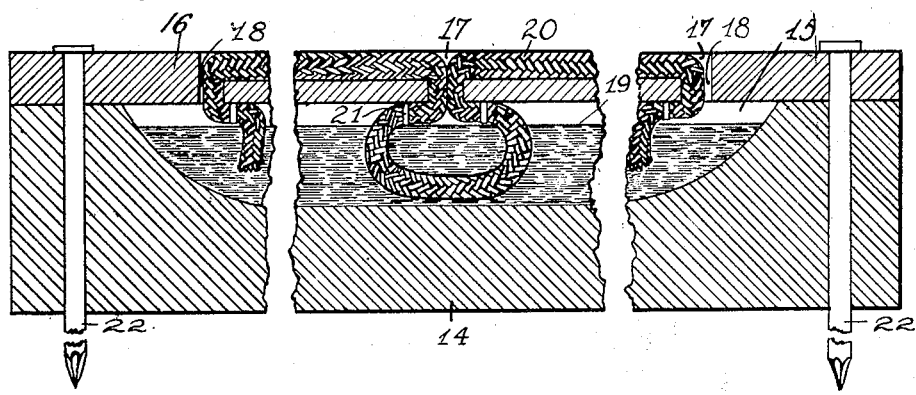
Witness
Lynn Latta
Inventor
Henry Windahl
By Orwig & Bair Attorneys

UNITED STATES PATENT OFFICE.

HENRY WINDAHL, OF NEW SHARON, IOWA, ASSIGNOR OF ONE-THIRD TO ANDREW M. EVANS, OF NEW SHARON, IOWA.

POULTRY-ROOST.

1,351,456.  Specification of Letters Patent.  Patented Aug. 31, 1920.

Application filed September 25, 1918. Serial No. 255,725.

*To all whom it may concern:*

Be it known that I, HENRY WINDAHL, a citizen of the United States, and a resident of New Sharon, in the county of Mahaska and State of Iowa, have invented a certain new and useful Poultry-Roost, of which the following is a specification.

The object of my invention is to provide a poultry roost of simple, durable and inexpensive construction.

More particularly it is my object to provide a poultry roost having cross bars or roost members, provided with a receptacle for a disinfectant or the like and with a cover therefor having a groove and having means for transmitting the disinfectant to the cover so that the fowls roosting on the cross bars will be subject to the action of the disinfectant.

With these and other objects in view my invention consists in the construction, arrangement and combination of the various parts of the device, whereby the objects contemplated are attained as hereinafter more fully set forth, pointed out in my claim and illustrated in the accompanying drawings, in which:

Figure 1 shows a perspective view of a roost embodying my invention.

Fig. 2 shows a vertical, transverse, sectional view through one of the cross bars taken on the line 2—2 of Fig. 1.

Fig. 3 shows a longitudinal, sectional view through one of the cross bars, parts being broken away, the view being taken on the line 3—3 of Fig. 2.

In the accompanying drawings I have used the reference numerals 10 and 11 to indicate respectively the front and rear members of a frame forming part of the device.

End members 12 connecting the ends of the members 10 and 11 are provided. The member 11 may be supported on a wall or otherwise as may be desired, and the member 10 may be supported in any suitable way, as for instance, by means of the legs 13.

As many of the cross bars may be employed as desired, and it will, of course, be understood that the size of the frame and length of the cross bars may be regulated according to the requirements.

In the accompanying drawings I have shown one of the cross bars which I will now describe.

Each cross bar consists of a bar 14 preferably of wood of sufficient strength for the purpose and having its ends supported upon the members 12. In the upper surface of the cross bar member 14 is a longitudinally arranged groove 15 which terminates short of the ends of the bar.

Resting upon the upper surface of the cross bar 14 is a cover strip 16 having in its upper surface a longitudinal groove 17. In the bottom of the groove 17 is a plurality of openings 18 extending through the lower portion of the cover strip, as illustrated in Fig. 3; the openings 18 being successively spaced from each other along the cover plate.

The groove 15 is designed to receive a liquid disinfectant 19 and there is threaded through the openings 18 a wick 20, shown in Fig. 3, which is extended down through the openings into the liquid 19.

The wick 20 may be fastened to the cover strip 16 by means of staples 21 or any other suitable fastening devices. The cover strip 16 is fastened to the bar 14 by means of nails or other suitable devices 22, which nails extend down below the cross bar 14 and may be driven into the end members 12 for fastening the cross bars to the end members.

It will be seen that when it is desired, the cover strips may be removed by removing the nails 22 for cleaning out the groove 15 and putting in a fresh supply of disinfectant, or for replacing the wick 20 with a new one.

The entire cross bars may be readily and easily removed for cleaning or otherwise.

The device is of very simple and inexpensive construction and on account of the fact that the bars may be assembled independently of the frame, it will be seen that the essential parts of the invention may be stored or shipped in convenient form, and may be readily and easily installed on the job.

Some changes may be made in the construction and arrangement of the parts of my improved roost without departing from the essential purposes of my invention, and it is my intention to cover by my claim any modified forms of structure or use of mechanical equivalents which may be reasonably included within their scope.

I claim as my invention:

A poultry perch, comprising a perch bar formed with an upwardly opening channel extending throughout the major portion of its length, a top bar mounted on said perch bar and covering said channel, said top bar being formed with an upwardly opening groove throughout the major portion of its length, and formed with spaced holes forming communication between said groove and channel, means for securing the top bar to the perch bar, and a wick member lying in said groove, said wick member also being extended through the holes in said top bar into said channel.

Des Moines, Iowa, August 29, 1918.

HENRY WINDAHL.